United States Patent [19]
Winckelhaus

[11] 3,782,841
[45] Jan. 1, 1974

[54] SYSTEM FOR SECURING AN ANNULAR MEMBER TO A SHAFT FOR TORQUE TRANSMISSION THEREBETWEEN

[76] Inventor: Werner Winckelhaus, Manteuffelstrasse 18, Duisburg, Germany

[22] Filed: Feb. 18, 1972

[21] Appl. No.: 227,505

[52] U.S. Cl............ 403/373, 64/6, 64/30 R, 403/370
[51] Int. Cl........................................... B60b 27/06
[58] Field of Search............. 287/52, 52.09, 52.06, 287/6; 64/30 A, 30 R, 30 E

[56] References Cited
UNITED STATES PATENTS
| | | | |
|---|---|---|---|
| 3,210,104 | 10/1965 | Davis et al. | 287/52 R |
| 3,407,627 | 10/1968 | Latsch et al. | 64/30 E |
| 3,434,303 | 3/1969 | Leyer | 287/52.09 |

*Primary Examiner*—Charles J. Myhre
*Assistant Examiner*—Randall Heald
*Attorney*—Karl F. Ross

[57] ABSTRACT

An annular member, such as a flywheel, pulley, sprocket wheel or disk, is secured to a shaft for torque transmission therebetween by a hub sleeve having an internally smooth, circumferentially continuous nonsplit configuration adapted to smoothly fit over the shaft. A doubly-conical compression ring is seated on the sleeve which is composed of steel and is elastically compressible. The compression ring is clamped between a pair of annular thrust rings having similar conicities and provided with equispaced bores through which bolts are threaded to draw the thrust rings together and urge the sleeve under radial compression against the shaft. When the torque capacity of the system is M, the axial compression force S is established such that the relationships $S = 2.3\ M/(d-20)$ or $S = 3\ M/(d-20)$ result, where $d$ is the diameter of the shaft. Under these conditions, the sleeve is elastically deformed in a circumferentially undulating pattern and elastically deforms the shaft in a corresponding manner to bring about a mating noncircular fit between the sleeve and shaft to prevent slippage.

8 Claims, 7 Drawing Figures

SYSTEM FOR SECURING AN ANNULAR MEMBER TO A SHAFT FOR TORQUE TRANSMISSION THEREBETWEEN

FIELD OF THE INVENTION

The present invention relates to a system for securing a rotatable annular member to a shaft and, more particularly, to a system for effecting torque transfer between an annular rotatable member and a shaft carrying same.

BACKGROUND OF THE INVENTION

Various devices have been developed heretofore for effecting torque transfer between a rotatable member, such as a flywheel, gear, pulley, sprocket wheel or other rotatable disk, and a shaft carrying same, and passing through the hub of the annular rotatable member. For example, the shaft may be provided with a keyway accommodating a key which extends into a slot in the inner periphery of the hub to lock the annular member to the shaft for transmission of torques up to that which can cause shearing of the key or breakage of the shaft or web. Similar means includes setscrews carried by the hub of the annular rotatable member and receivable in a bore of the shaft or adapted to abut against a flat or recess of the latter. Yet another positive coupling is provided when a cotter pin, shear pin or wedge is driven radially or tangentially through the hub into a bore or groove of the shaft. In addition to these positive coupling systems, mention may also be made of variants which use a splined shaft or a noncircular preformed configuration of shaft and hub to prevent relative rotation and ensure maximum torque transfer.

In addition to these methods, there are techniques known for securing a hub to a shaft less positively. For example, a compression ring may retain the hub against the shaft and, in general, the hub may be split or subdivided so that opposite portions thereof can be urged radically against the shaft. It is also possible, of course, to dimension the annular rotatable member to receive the shaft with a so-called pressfit whereby the shaft is force-fitted into the annular member.

The positive coupling systems may also be used together with some of the nonpositive arrangements and vice versa. However, each of the arrangements described above possesses a significant disadvantage from the point of view of coupling security and convenience. In those systems, in which keys, setscrews, shear pins, cotter pins and the like are provided, it is essential to bring about registry of a bore, slot or channel in the hub and on the shaft to allow the transverse member to pass through them. This is often inconvenient, since transverse access to the hub may be limited and also limits the location in which the annular roatable member can be secured to the shaft to those locations in which the shaft has been preformed with its bore, flat, recess or channel. Arrangements which use preformed noncircular shafts and complementary hub structures, have the disadvantage that manufacturing steps are increased, the costs of the several parts are high and care must be taken in fitting the parts together. Those systems characterized by nonpositive connections frequently are incapable of transmitting the maximum torque which the system otherwise is capable of achieving and is dependent upon a frictional interengagement which is torque-limiting. Finally, some or all of the above-described conventional systems have the disadvantage that release of the annular rotatable member cannot readily be reassembled on the shaft.

OBJECTS OF THE INVENTION

It is therefore the principal object of the present invention to provide an improved system for connecting a rotatable member to a shaft with maximum torque transfer capability and without the disadvantages enumerated above.

A further object of the present invention is to provide an improved system for locking an annular member, such as a fly-wheel, disk, ring, sprocket wheel, gear or pulley, to a shaft for torque transmission therebetween without slippage and at the maximum level permitted by the dimensioning of the shaft and annular member and independent of the anchoring means, while eliminating the earlier need to angularly align shaft and annular member.

Still another object of the invention is to provide an assembly for the transmission of a maximum torque between a shaft and an annular member of the type described which allows relative angular positioning of the shaft and the member at any location desired.

SUMMARY OF THE INVENTION

These objects and others which will become apparent hereinafter are attained, in accordance with the present invention, with a system which is based upon my discovery that under a limited range of circumstances, it is possible to effect an elastic deformation of a hub sleeve and the juxtaposed normally smooth surface of the shaft so as to impart an undulating contour to these confronting portions which matingly engage and are noncircular so as to prevent relative angular slippage without the need to basically deform either the sleeve or the shaft, and eliminating such devices as shear pins, keys and locking screws to bring about a substantially positive torque-transmitting junction between the elements.

My invention comprises a shaft and a flywheel, disk, ring, gear, sprocket wheel, pulley or other wheel member, having an elastically deformable steel hub sleeve adapted to fit over the smooth-surfaced shaft, generally the shaft and sleeve being dimensioned to allow the sleeve to be inserted over the shaft without significant application of force. Both the shaft and the sleeve are of circular cross-section and are unsplit, i.e. are circumferentially continuous. According to an important feature of the invention, a doubly-conical compression ring is carried by the sleeve and is compressed inwardly between a pair of thrust rings whose inner surfaces are complementary to the respective conical surfaces of the compression ring.

The thrust rings are, moreover, provided with axially aligned bores traversed by bolts or other screwthread tensioning means axially drawing the thrust rings together to apply a radial compressive force to the compression ring and thereby to the sleeve and the shaft which is so dimensioned that the axial force applied to the compression ring by the thrust ring (i.e. the force drawing the thrust rings together and the tensile force developed by the bolts) satisfies the relationship $S = 2.3 M/(d-20)$ or $S = 3 M/(d - 20)$, where $S$ is the compressive force, $M$ is the maximum torque to be transmitted by the junction of the hub and the shaft and $d$ is the diameter of the shaft.

It appears that these two formulae define conditions in which the wavelength of the undulations mentioned above is a simple fraction of the circumference so that a stable deformation develops. These formulae, moreover, may define a range of S values in which optimum results are obtained at these limits, provided that the two conical surfaces of the compression ring have angles (conical half angles) of $\alpha = 10°$ and $\alpha' = 10°$ respectively for the first formula and the conical half angles of $\alpha = 10°$ and $\alpha' = 20°$ in the case of the second. The conical half angles may thus be represented by the values $\alpha \approx 10°$ and $10° \leq \alpha' \leq 20°$ as will be apparent hereinafter. In other words, in an unstressed state of the sleeve, the latter may simply be slipped over the shaft without application of force, whereupon the compression ring is tightened to clamp the circumferential continuous and unsplit hub sleeve thereagainst so that a wave-type undulation is formed in both the hub sleeve and the shaft to create, purely by elastic deformation, mutually interfitting noncircular formations. The compression force as described above appears to produce a polar moment of resistance (section modulus) in the hub sleeve which corresponds at least to the polar moment of resistance (section modulus) of the steel shaft to ensure the elastic deformation and interfitting relationship mentioned.

The most significant advantage of the system of the present invention is that, without slipping the hub sleeve, weakening portions thereof or providing grooves, bores, recesses, setscrews and clamping flanges thereon, and without corresponding deformation of the shaft prior to mounting of the rotatable member thereon, it is possible to interconnect the rotatable member and the shaft to transfer a torque M which may be dimensioned well above that which would ordinarily be contemplated. In fact, the torque capacity of the steel shaft can be fully utilized. There is no uncontrolled slip between hub sleeve and shaft and, since the sleeve and shaft are deformed only elastically, removal of the compression system permits the sleeve and shaft to resume their original configuration and enables the rotatable member to be withdrawn with ease.

Most surprising is the fact that the undulating contour provides maximum compression and inward deformation in the regions between the bores or holes in the thrust rings and, in fact, in one embodiment of the invention, the openings in the thrust rings are provided as radial slots so that the material beneath the bolts is omitted and the bolts are seated in U-shaped recesses. It has been found to be most advantageous to dimension the bores or openings such that the tensioning bolts are hugged by the walls of the opening and only minor play is provided between them. It has also been found to be advantageous to angularly equispace the bores along a circle and, in some cases, to provide two or more circles of such bores. This, of course, increases the period and decreases the wavelength of the undulating elastic deformation. Of special importance is the fact that the system may operate with conicities (conical angles) outside the self-blocking range whereby the tightening of the bolts is simplified and the compression system automatically relaxes upon release of the bolts. Furthermore, the compresssion cones are advantageously so constructed and arranged as to be lubricated, thereby providing further insurance against a self-locking relationship.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
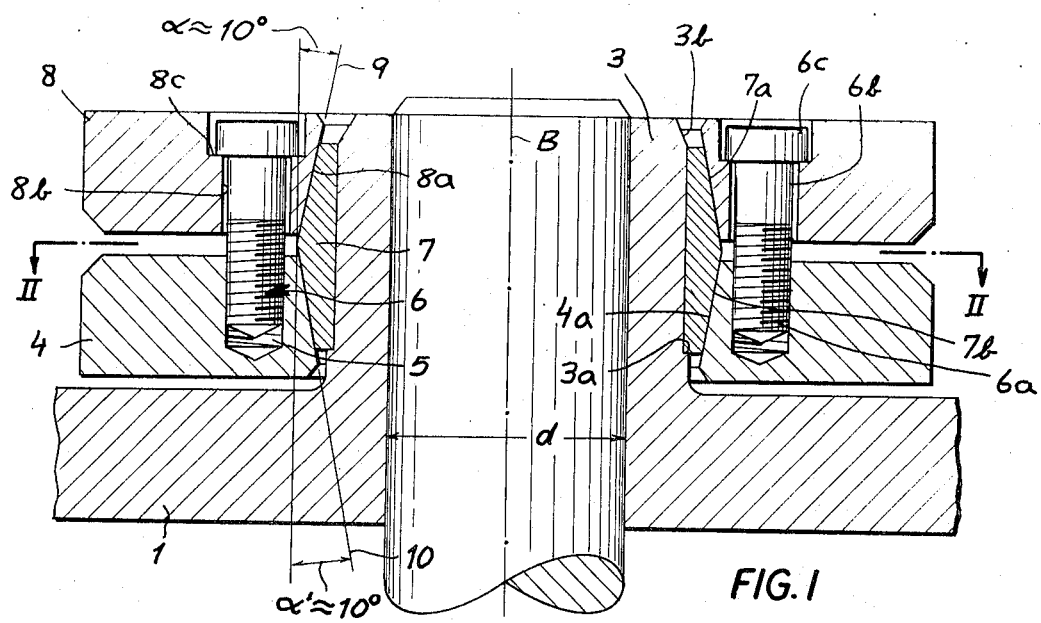
FIG. 1 is a cross-sectional view of a torque-transmitting connection according to the present invention.
Figure 2:
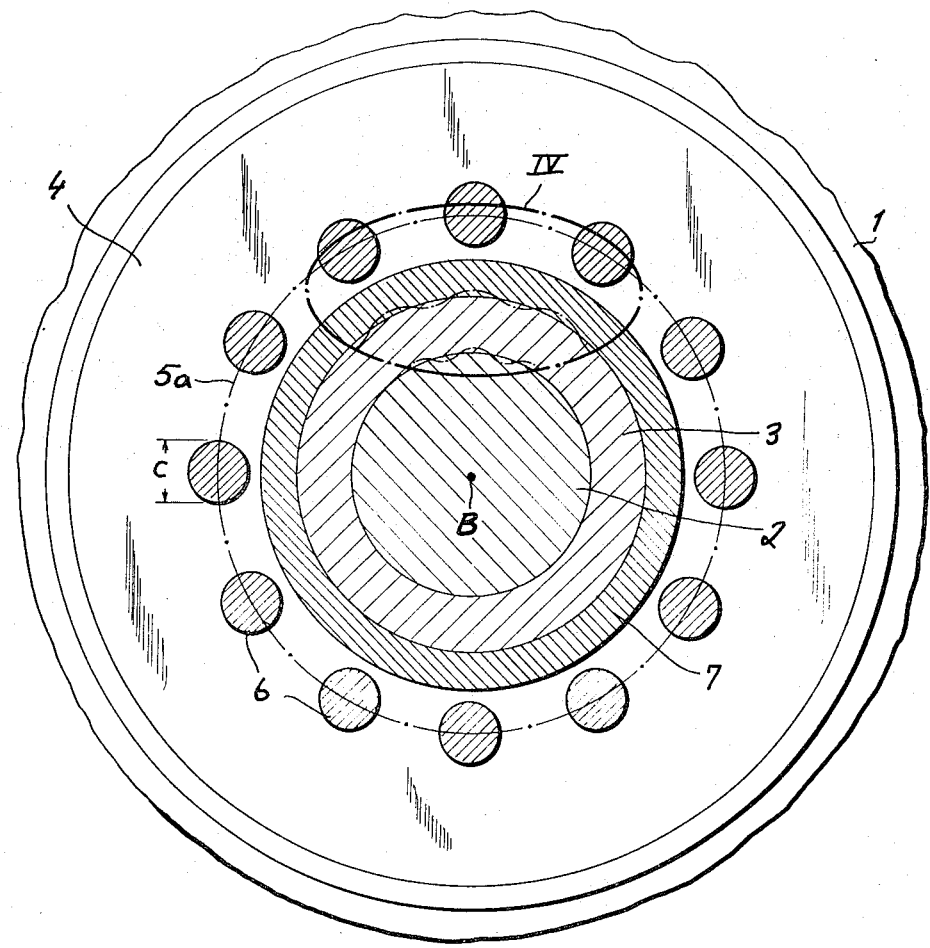
FIG. 2 is a cross-sectional view taken along the line II — II of FIG. 1.

In FIGS. 1 and 2 of the drawing, I show the basic elements of a torque-transmitting connection according to the present invention. This system comprises a flywheel, disk, pulley, gear, sprocket or other wheel 1, hereinafter described as the rotatable annular member, which is mounted upon a shaft 2 dimensioned to deliver a torque M and having a shaft diameter $d$ as illustrated in FIG. 1. The annular member 1 is provided with an axially extending hub sleeve 3, projecting beyond a shoulder 3a against which a compression ring 7 is axially seated. Since the sleeve is secured to, or unitary with, the annular member 1, only at one end, it may be elastically deformed as described in connection with FIG. 4. The free end 3b of the sleeve is beveled to enable the compression ring 7 to be readily mounted upon the sleeve 3. The sleeve 3 and the shaft 2 are composed of steel.

The compression ring 7 is provided with two conical surfaces, including an outer surface 7a having an apex half angle $\alpha = 10°$, and an inner conical surface 7b having an apex half angle $\alpha' = 20°$.

An inner thrust ring 4 is provided with a conical inner surface 4a of the half angle $\alpha$ 10° as already noted and is designed to compress the ring 7 radially inwardly as this thrust ring is drawn in the direction of arrow A axially inwardly. The opposing thrust ring 8 has an inner surface 8a with a half angle $\alpha' = 10°$ and slidably engages the conical surface 7a of the compression ring. The conical surfaces may be lubricated with grease, oil or with a graphite, molybdenum disulfide or polytetrafluoroethylene coating as desired. The plate 4 is provided with a plurality of threaded bores 5 located along a common circle 5a and provided in angularly equispaced relationship about the axis B of the system. Bolts 6 having shanks 6a threaded into the bores 5, are provided with large-diameter nonthreaded shoulders 6b traversing axially aligned bores 8b of the thrust plate 8. The cap screw heads 6c, however, are seated against inner shoulders 8c around each bore 8b. The bolts 6 are located as close as possible to the compression ring 7 and it has been found to be advantageous to provide the outer diameter of the compression ring 7 equal to or just slightly smaller (by 1 to 2 mm) than the diameter of the circle of centers 5a less the diameter C of a bolt 6 in the region of the latest diameter portion of the compression ring 7. Under these circumstances practically only the thrust ring portions 4a etc. between the bores 5 transfer the compressive forces generated by the cones to the compression ring.

The circumferentially continuous and closed, undivided hub sleeve 3 slips easily in the unstressed state upon the smooth shaft 2. When the formulae I and II are followed, the polar moment of resistance $W_1$ (section modulus) of the hub is approximately equal to the polar moment of resistance $W_2$ of the steel shaft with the diameter D. The bolts 6 are so tightened that the force S is applied to the thrust rings 4 and 8 and is as follows:

$S = 2.3\ m/(d - 20)$      Formula I or $S = 3\ m/(d - 20)$ Formula II

Figure 3:
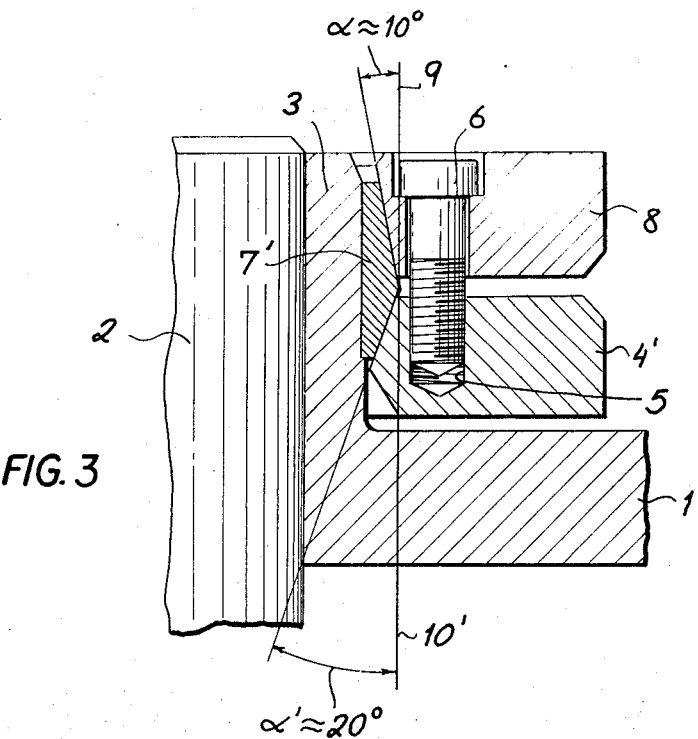
FIG. 3 is a fragmentary cross-sectional view illustrating another embodiment of the invention.

In the case of Formula I, the apex angle $\alpha$ of the cone 9 is about 10° whereas the apex half angle $\alpha'$ of the cone 10' is also about 10°. The system of FIG. 3, of course, is generally similar except that the compression ring 7' and the thrust ring 4' are dimensioned to correspond to Formula II. In this case, the apex half angle $\alpha$ is approximately equal to 10° for the cone 9 and the apex angle $\alpha'$ is approximately equal to 20° for the cone 10'.

Figure 4:
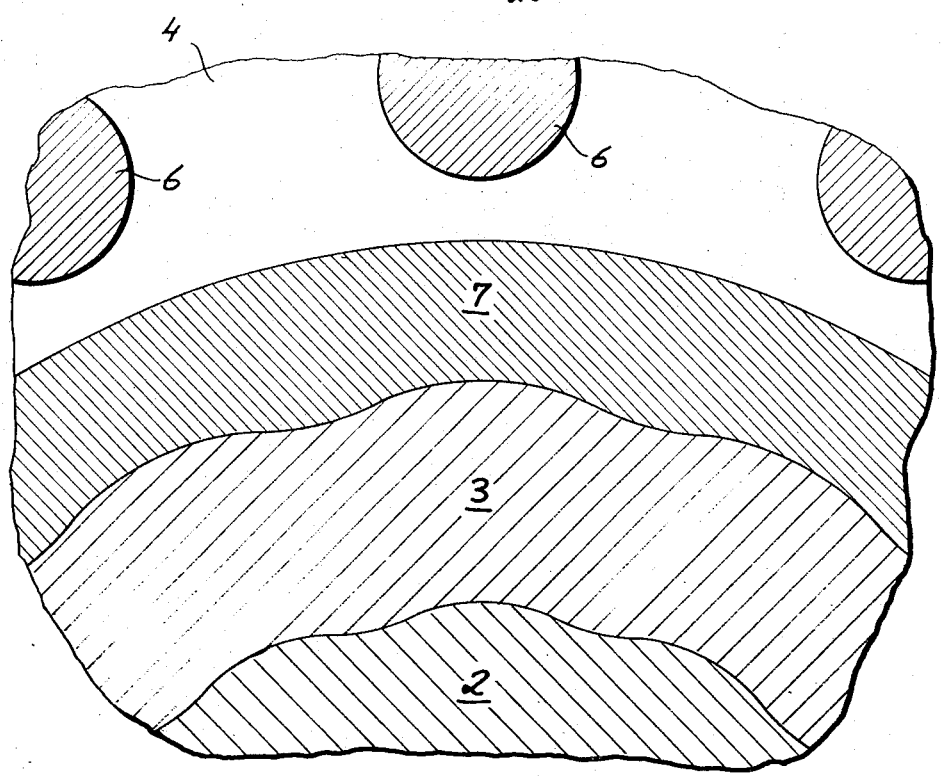
FIG. 4 is a detail view showing the portion of FIG. 2 designated at IV in greatly enlarged form.
Figure 7:
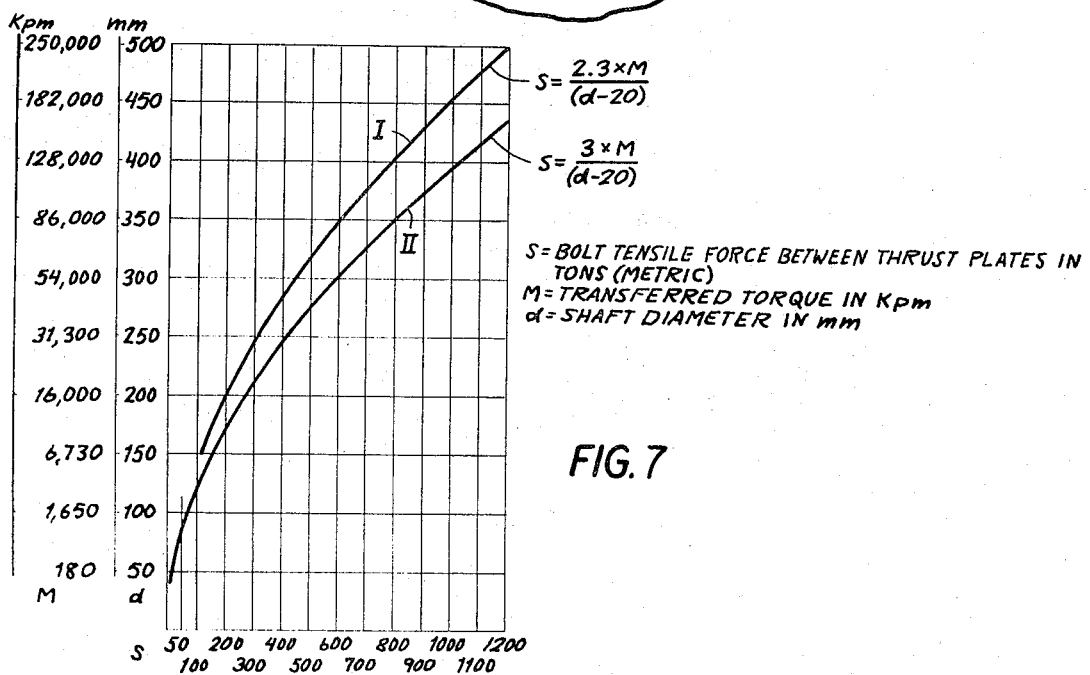
FIG. 7 is a graph illustrating the invention.

In FIG. 4 I have shown the elastic deformation of the shaft 2 and hub 3 which forms an undulating pattern and practically a form-fitting structure between them. The system, of course, is dimensioned to transfer the maximum torque M which can be sustained by the shaft. In FIG. 7, the relationship between the torque in Kp-meters (Kpm), the diameter $d$ in millimeters (mm) and the bolt tensile force S in metric tons ($t$) is set out. The curves I and II correspond to the correspondingly numbered formulae.

Figure 5:
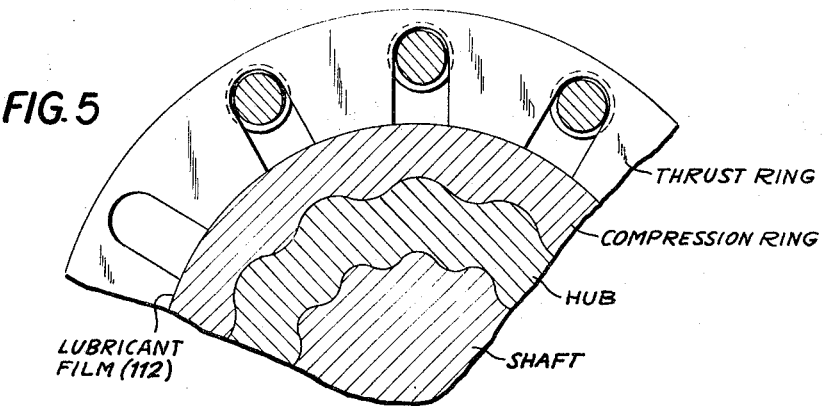
FIG. 5 is a view similar to FIG. 4 illustrating another embodiment of the invention.
Figure 6:
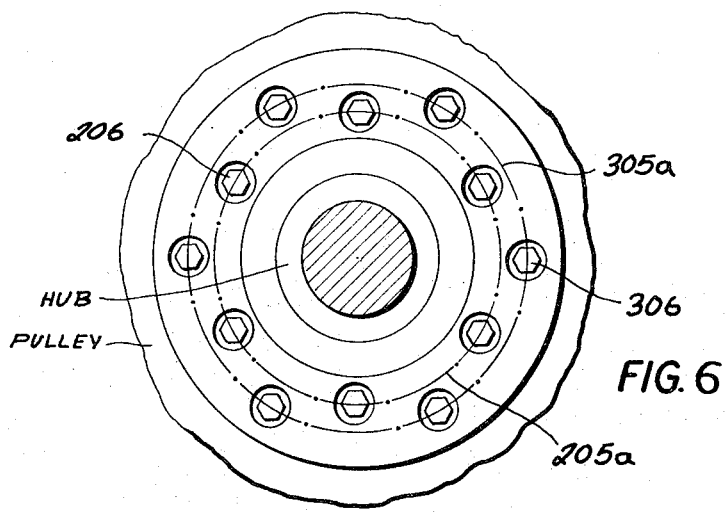
FIG. 6 is an end view illustrating still another embodiment.

A modified system has been illustrated in FIG. 5 wherein the region beneath each bolt 106 of the ring 108 is cut away at 111 so that the bolts are received within U-shaped recesses of the thrust ring. It should be noted that the compression ring may have U-shaped recesses within which the bolts lie as well. In FIG. 5, the shaft 102 is also surrounded by a hub 103 attached to a wheel or other annular member and carrying, in turn, compression ring 107. A lubricant film can be provided as represented at 112 between the compression ring 107 and the hub 103 and/or thrust ring 108. In the embodiment of FIG. 6, it can be seen that the bolts 206 lie along a circle of centers 205a of a smaller diameter than the circle of centers 305a of another array of angularly equispaced bolts 306. Otherwise the system of FIG. 6 operates in the manner already described in FIGS. 1 – 4.

I claim:

1. A torque-transmitting assembly comprising:
   a shaft adapted to withstand a torque M and having a diameter $d$;
   a rotatable annular member mounted on said shaft and having a circumferentially continuous circular cylindrical metal sleeve of uniform cross-section and smoothly fitting on said shaft and axially removable therefrom in an unstressed state of said sleeve;
   a compression ring on sleeve of a compressive strength sufficient to transmit a sleeve-deforming force thereto, said ring having a pair of oppositely converging outer conical surfaces including an axially inwardly located conical surface with a half angle $\alpha'$ and an axially outwardly located surface having a half angle $\alpha$;
   a pair of thrust rings axially spaced on opposite sides of said compression ring and having respective inner conical surfaces engaging at outer conical surfaces of said compression ring, said thrust rings being provided with angularly equispaced registering openings; and
   respective bolts threadedly interconnecting said thrust rings together with a bolt-produced force S wherein
   $(2.3\ M)/d - 20) \leqq S \leqq 3\ M/(d - 20)$ and
   $\alpha \approx 10°$ while
   $10° \leqq \alpha' \leqq 20°$.

2. The torque-transmitting assembly defined in claim 1 wherein $S = 2.3\ m/(d - 20)$, $\alpha = 10°$ and $\alpha' = 10°$.

3. The torque-transmitting assembly defined in claim 1 wherein said bolts are arrayed along a circle of centers having a diameter slightly greater than the maximum outer diameter of said compression ring plus the diameter of one of said bolts in the region of the maximum outer diameter of said compression ring.

4. The torque-transmitting assembly defined in claim 3 wherein said shaft is composed of steel and said sleeve is composed of metal.

5. A torque-transmitting assembly comprising:
   a shaft adapted to withstand a torque M and having a diameter $d$;
   a rotatable annular member mounted on said shaft and having a circumferentially continuous circular-cross-section sleeve smoothly fitting on said shaft and axially removable therefrom in an unstressed state of said sleeve;
   a compression ring on said sleeve having a pair of oppositely converging outer conical surfaces including an axially inwardly located conical surface with a half angle $\alpha'$
   a pair of thrust rings axially spaced on opposite sides of said compression ring and having respective inner conical surfaces engaging at outer conical surfaces of said compression ring, said thrust rings being provided with angularly equispaced registering openings;
   respective bolts threadedly interconnecting said thrust rings together with a bolt-produced force S wherein
   $2.3\ M/(d - 20) \leqq S \leqq 3\ M/(d - 20)$ and
   $\alpha \approx 10°$ while
   $10° \leqq \alpha' \leqq 20°$,
   said bolts being arrayed along a circle of centers having a diameter slightly greater than the maximum outer diameter of said compression ring plus the diameter of one of said bolts in the region of the maximum outer diameter of said compression ring, said shaft being composed of steel and said sleeve being composed of metal, and a multiplicity of angularly equispaced bolts bridging said thrust rings and located along a circle of centers having a diameter different from that of the first-mentioned circle of centers.

6. A torque-transmitting assembly comprising:
   a shaft adapted to withstand a torque M and having a diameter $d$;
   a rotatable annular member mounted on said shaft and having a circumferentially continuous circular-cross-section sleeve smoothly fitting on said shaft and axially removable therefrom in an unstressed state of said sleeve;

a compression ring on said sleeve having a pair of oppositely converging outer conical surfaces including an axially inwardly located conical surface with a half angle $\alpha'$ and an axially outwardly located surface having a half angle $\alpha$;

a pair of thrust rings axially spaced on opposite sides of said compression ring and having respective inner conical surfaces engaging at outer conical surfaces of said compression ring, said thrust rings being provided with angularly equispaced registering openings; and respective bolts threadedly interconnecting said thrust rings together with a bolt-produced force S wherein $2.3 M/(d-20) \lesssim S \lesssim 3 M/(d-20)$ and
$\alpha \approx 10°$ while
$10° \lesssim \alpha' \lesssim 20°$ said bolts being arrayed along a circle of centers having a diameter slightly greater than the maximum outer diameter of said compression ring plus the diameter of one of said bolts in the region of the maximum outer diameter of said compression ring, said shaft being composed of steel and said sleeve being composed of metal, and wherein said openings in at least one of said thrust rings are U-shaped recesses opened toward said shaft.

7. A torque-transmitting assembly comprising:

a shaft adapted to withstand a torque M and having a dimeter $d$;

a rotatable annular member mounted on said shaft and having a circumferentially continuous circular-cross-section sleeve smoothly fitting on said shaft and axially removable therefrom in an unstressed state of said sleeve;

a compression ring on said sleeve having a pair of oppositely converging outer conical surfaces including an axially inwardly located conical surface with a half angle $\alpha'$ and an axially outwardly located surface having a half angle $\alpha$;

a pair of thrust rings axially spaced on opposite sides of said compression ring and having respective inner conical surfaces engaging at outer conical surfaces of said compression ring, said thrust rings being provided with angularly equispaced registering openings;

respective bolts threadedly interconnecting said thrust rings together with a bolt-produced force S wherein $2.3 M/(d-20) \lesssim S \lesssim 3 M/(d-20)$ and
$\alpha \approx 10°$ while
$10° \lesssim \alpha' \lesssim 20°$, said bolts being arrayed along a circle of centers having a diameter slightly greater than the maximum outer diameter of said compression ring plus the diameter of one of said bolts in the region of the maximum outer diameter of said compression ring, said shaft being composed of steel and said sleeve being composed of metal, and a lubricating film between said surfaces of said thrust rings and said surfaces of said compression ring.

8. A torque-transmitting assembly comprising:

a shaft adapted to withstand a torque M and having a dimeter $d$;

a rotatable annular member mounted on said shaft and having a circumferentially continuous circular-cross-section sleeve smoothly fitting on said shaft and axially removable therefrom in an unstressed state of said sleeve;

a compression ring on said sleeve having a pair of oppositely converging outer conical surfaces including an axially inwardly located conical surface with a half angle $\alpha'$ and an axially outwardly located surface having a half angle $\alpha$;

a pair of thrust rings axially spaced on opposite sides of said compression ring and having respective inner conical surfaces engaging at outer conical surfaces of said compression ring, said thrust rings being provided with angularly equispaced registering openings; and respective bolts threadedly interconnecting said thrust rings together with a bolt-produced force S wherein $2.3 M/(d-20) \lesssim S \lesssim 3 M/(d-20)$ and
$\alpha \approx 10°$ while
$\alpha' \approx 20°$.

* * * * *